J. A. CUMMINGS.
HARNESS.
APPLICATION FILED AUG. 28, 1909.
964,618.
Patented July 19, 1910.
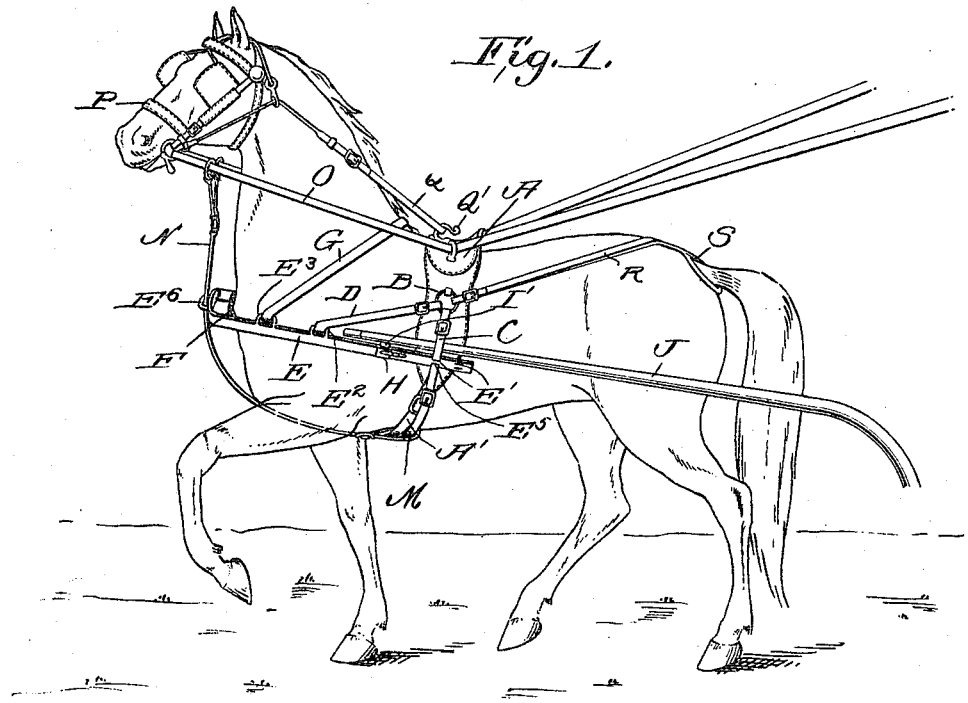
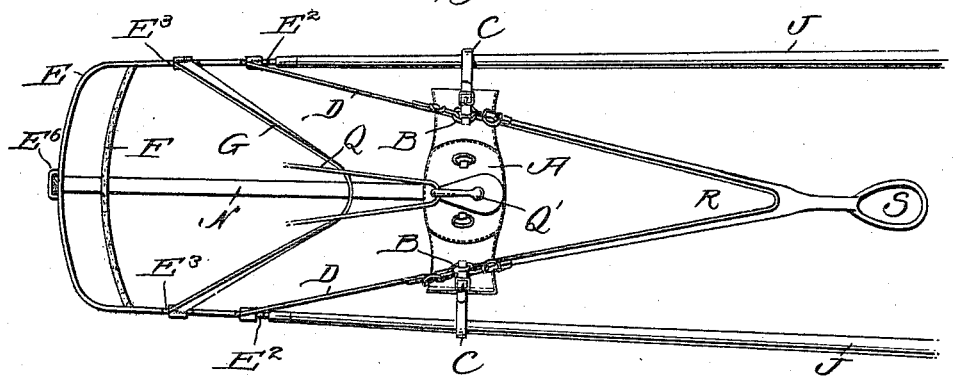
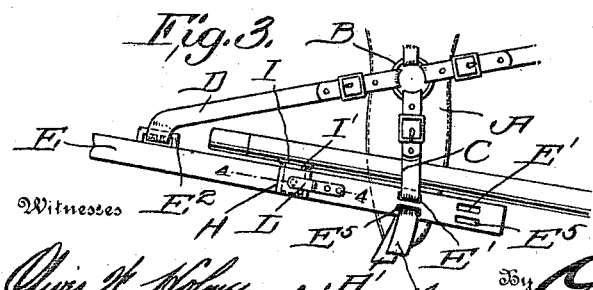
Inventor
John A. Cummings

UNITED STATES PATENT OFFICE.

JOHN A. CUMMINGS, OF BENEDICTA, MAINE.

HARNESS.

964,618.

Specification of Letters Patent. Patented July 19, 1910.

Application filed August 28, 1909. Serial No. 515,058.

*To all whom it may concern:*

Be it known that I, JOHN A. CUMMINGS, a citizen of the United States, residing at Benedicta, in the county of Aroostook and State of Maine, have invented a new and useful Improvement in Harness, of which the following is a specification.

This invention relates to harness, the object being to provide a harness which is so constructed that it will be held away from the animal upon which it is placed in such a manner that all danger of the horse becoming rubbed is prevented.

Another object of the invention is to provide a harness having a draft frame adapted to extend out in front of the breast of the horse, the frame being of such a size that it will be held away from the sides of the horse and is so connected to the saddle and shafts that the vehicle can be drawn in such a manner that all danger of scarring the horse is prevented.

A further object of my invention is to connect the side bars of the draft frame together by a breast strap adapted to bear against the breast of the animal in such a manner that all danger of breaking the wind of the horse is prevented.

A still further object of my invention is to provide very novel means for supporting the draft frame and connecting the same to the shafts.

Still another object of my invention is to provide a harness in which the breeching and traces are dispensed with.

With these various objects in view, my invention consists in the novel features of construction hereinafter fully described and pointed out in the claims.

In the drawing forming a part of this specification: Figure 1 is a perspective view of a horse showing my improved harness in position thereon. Fig. 2 is a diagrammatic plan view of the same. Fig. 3 is a detail enlarged side view showing the manner of connecting the shaft to the draft frame. Fig. 4 is a section taken on the line 4—4 of Fig. 3.

In carrying out my improved invention, I employ a saddle A provided with the ordinary girth A' for securing the same in position on the horse, the sides of the saddle being provided with rings B to which are connected straps C and D, the strap C being secured in one of the slots E' formed in the rear of the draft frame E which extends out beyond the front of the horse as clearly shown, and is provided with a loop $E^2$ to which is connected the strap D so that the same will be held in its proper position. A breast strap F connects the side bars of the frame E adjacent its forward end against which the horse's breast is adapted to bear when pulling and the frame E is of such a size that it will not come into contact with the horse in any way. To insure the frame E being held in a horizontal position so that the breast strap F will be held in proper position upon the breast of the horse, I employ a strap G which extends over the neck of the horse as clearly shown and has its ends connected to loops $E^3$.

The side bars of the frame E are provided with shoulders H having vertical rectangular openings H' formed therein forming sockets into which are adapted to fit correspondingly shaped lugs I' carried by curved plates I secured to the under side of the shaft J adjacent their forward ends. The lugs are apertured transversely as shown at $I^2$ adapted to register with transverse openings $H^2$ formed in the shoulders H and through which are adapted to pass pins K carried by springs L secured to the frame E for locking the lugs firmly in the sockets and it will be seen that by springing the springs outwardly the pins can be drawn out of the openings of the lugs so that the shafts can be readily detached from the draft frame.

The ends of the frame E are provided with slots $E^5$ in one of which is adapted to be connected a girth M carrying a martingale N which extends up through a guide $E^6$ formed on the bowed portion of the draft frame E through the eyes of which are adapted to pass the reins O which are connected to a bridle P in the ordinary manner, said bridle being provided with a check rein Q which is connected to the ordinary check hook Q' carried by the saddle A and the saddle is provided with eyes through which the reins pass. It will be seen that by this arrangement the draft frame E can be adjusted with respect to the saddle to suit different sized horses by changing the positions of the straps C and the girth M in the respective slots of the frame. Connected to the rings B is a strap R which extends rearwardly and is connected to the crupper strap S for holding the saddle in its proper position upon the horse and it will be seen that by this arrangement a strap running from the center of the saddle to the crupper is dispensed with.

From the foregoing description, it will be seen that I have provided a harness which is exceedingly simple and cheap in construction and one in which all but the saddle and supporting straps are held out of engagement with the animal and it will be seen that the shafts are held to the draft frame in such a manner that the draft frame and the shafts will be held out of contact with the horse.

Having thus fully described my invention, what I claim as new and desire to secure by Letters Patent, is:

1. A harness comprising a saddle, a bowed draft frame adjustably connected to said saddle, and provided with vertical sockets, depending lugs carried by a pair of shafts adapted to fit within said sockets and spring actuated pins carried by the draft frame for locking said lugs within said sockets.

2. A harness comprising a saddle having straps connected thereto supporting a draft frame, said draft frame having side bars connected together by a breast strap, and provided with sockets, lugs carried by a pair of shafts adapted to fit within said sockets and spring actuated pins carried by said draft frame adapted to pass through said sockets and lugs for securing said lugs within the sockets.

3. A harness comprising a saddle provided with rings, straps carried by said rings, a draft frame carried by said straps, a strap carried by the draft frame adapted to extend over the neck of the animal, a breast strap connecting the sides of said frame, a girth connected to the ends of said frame, and means carried by said frame for connecting it to the shafts of the vehicle.

4. A harness comprising a saddle provided with rings, straps carried by said rings, a draft frame carried by said straps adapted to extend out in front of the animal, a breast strap connecting the side bars of said frame, a strap carried by said frame adapted to extend over the neck of the animal, a girth connecting the ends of said frame, said frame being provided with sockets having transverse openings, lugs carried by the shaft of the vehicle provided with transverse openings adapted to fit in said sockets, and springs secured to the draft frame carrying pins adapted to pass through the openings of the sockets and lugs for connecting the draft frame to a pair of shafts.

JOHN A. CUMMINGS.

Witnesses:
DANIEL J. HICKIE,
F. J. McAVOY.